United States Patent [19]

Johnson et al.

[11] Patent Number: 4,533,423
[45] Date of Patent: Aug. 6, 1985

[54] PORTABLE SEAM WELDING MACHINE FOR THERMOPLASTIC SHEETS

[75] Inventors: Neil A. Johnson, Gahanna; Philip A. Taylor, Columbus, both of Ohio

[73] Assignee: G.R. Systems, Inc., Columbus, Ohio

[21] Appl. No.: 614,637

[22] Filed: May 29, 1984

[51] Int. Cl.³ ............................................. B32B 31/26
[52] U.S. Cl. ................................. 156/359; 156/308.4; 156/499; 156/574
[58] Field of Search .................. 156/499, 574, 71, 527, 156/359, 308.4

[56] References Cited

U.S. PATENT DOCUMENTS 4,175,998 11/1979 Hay et al. .......................... 156/499 X
4,259,142 3/1981 Kortepeter ....................... 156/499 X Primary Examiner—David Simmons
Attorney, Agent, or Firm—Frank H. Foster

[57] ABSTRACT

This invention relates to machines for heating and joining thermoplastic resin sheets and more particularly relates to a portable machine which fuses together the overlapping edges of large stationary sheets as the welding machine travels along the overlapping edges. The machine is moved along the opposed edges of the sheet at a velocity which is changed so that the velocity is substantially proportional to the instantaneous temperature of the heat source. The machine is therefore accelerated or decelerated in accordance with the selected velocity change algorithm which is exponentially in the preferred embodiment.

12 Claims, 10 Drawing Figures

PORTABLE SEAM WELDING MACHINE FOR THERMOPLASTIC SHEETS

FIELD OF THE INVENTION

This invention relates to machines for heating and joining thermoplastic resin sheets and more particularly relates to a portable machine which fuses together the overlapping edges of large stationary sheets as the welding machine travels along the overlapping edges. This permits in situ fabrication of larger sheets.

BACKGROUND ART

It is often desirable to weld or fuse together a multiplicity of sheets of thermoplastic materials, such as polyethylene, PVC or nylon, at a work site. The sheets are joined to produce a much larger sheet which can be used for such things as building covers, large tarpaulines or covers and for roofing material. It is more efficient to transport the bulk materials to the work site and join them there rather than joining them at a factory into a large, bulky, single sheet, then folding, transporting and unfolding that sheet.

Machines of this type are generally motor driven, self propelled machines in which a drive motor is connected through a drive train to one or more drive wheels. A heater, most commonly a hot air blower, and a feed means are provided on the machine for guiding the opposed overlapping edges of the sheets into the machine as the machine travels along the edges. The overlapping edges are guided past a heater or heat applying means through a compressing structure and then out of the machine.

In the operation of previous, conventional machines, the machine is initially set up, warmed and positioned on the sheets by an operator who then actuates the machine and guides it along the overlapping edges. Machines are manufactured and sold by companies such as Leister, Zinser and Pfaff. Other machines of this general type are shown in U.S. Pat. Nos. 4,050,972; 1,924,523; 2,556,476; 4,146,419; and others which have been cited in connection with the filing of this patent application.

Welding machines of this type require the application of heat to the overlapping sheets with the temperature range of approximately 400° F.–600° F. The most common prior art machines heat air and blow it upon the interfacing surfaces near the edges of the thermoplastic sheets. The hot air system, however, has several disadvantages. First, the air heating system must be heated to operating temperature prior to operation. This may take as long as fifteen minutes during which the energy used for heating the air is entirely wasted since the air is not sufficiently warm to raise the temperature of the sheet to the welding temperature during normal steady travel along the overlapping edges. Furthermore, during operation, the heat produced by the hot air heaters is not efficiently transferred to the thermoplastic sheet. Such machines therefore typically require heaters consuming electrical energy at a rate of 2500 to 4500 watts.

The high power requirement in turn results in a machine which requires operation at 240 volts and at a high current, typically in excess of 20 amps. The electrical cables and the machine itself which is necessary to operate at such a high power tends to be large, heavy and bulky and therefore difficult to transport to many work places, particularly to a building roof and the like. They are also difficult to move about and use during operation as a result of their size and bulk. There is therefore a need for a welding machine which consumes considerably less electrical energy and as a result may be lighter in weight and more conveniently transported and economically used. As a further convenience a machine is needed which can be energized from a standard 120 volt power source.

Another difficult with such prior art machines is that, after they are warmed up and positioned in place and their heat energy is directed to the plastic sheet by the operator, the operator has only a few seconds in which to begin the travelling motion of the welding machine. If he fails to move sufficiently fast, the machine will melt through the thermoplastic sheets forming a hole or other defect in the seam.

There is, therefore, a need for a machine which is not only more economical and efficient to use, but further, which is more convenient and can operate within less critical time tolerances requiring less operator skill and dexterity.

Although alternative heating sources might be utilized in a welding machine, one difficulty with them is that they do not instantaneously heat up to operating temperature or cool down to a nonoperating temperature at which they will not melt the plastic sheet. A finite time interval is required during which the temperature gradually increases or decreases. If such a heat source is positioned to transfer its heat to the overlapping edge of the sheet material when it is first turned on and is not moved until it reaches operating temperature, it will melt through the sheet material prior to reaching operating temperature and thus produce a defect in the seam. Furthermore, if at the instant the energy is applied to begin raising the temperature of the heat source the machine begins travelling at normal steady state linear velocity along the overlapping edges, suitable welding will not occur until the heat source reaches operating temperature. There will therefore be a considerable length along the overlapping edges which will not be joined properly.

There is, therefore, a need for a welding machine which can be positioned upon the plastic sheets with the sheets properly fed into the machine, then actuated and energized to begin moving and welding while its heater is heating up to operating temperature.

Previous welding machines require the continuous attention of the operator for steering them properly along the edges to be welded together. There is a need for a self-steering mechanism for use with such machines which can guide the welding machine along the overlapping edges without requiring steering by the operator. With no operator attention being required as the machine travels and welds, an operator's exposure to potentially dangerous fumes and gases is substantially reduced.

BRIEF SUMMARY OF THE INVENTION

In accordance with the above objects, the efficiency, transportability and ease of operation of the welding machine can all be substantially improved by utilizing a radiant heater interposed between the feed paths of the overlapping edges of the thermoplastic sheet. The heat is much more efficiently transferred to the sheet material and therefore less electrical energy is required. This means that lighter weight cables and machines may be used. It further means that extensive warm up periods, such as those required with hot air machines, are no longer required.

In order to begin the welding operation essentially immediately after energization of the heating means and while the radiant heater heats up or in order to continue welding after the heater is deenergized and while the machine cools down, the machine is moved along the opposed edges of the sheet at a velocity which is changed so that the velocity is substantially proportional to the instantaneous temperature of the heat source. The machine is therefore accelerated or decelerated in accordance with a selected velocity change algorithm which is exponentially in the preferred embodiment.

The automatic steering system of the present invention utilizes a light source positioned above the overlapping edges and at least three light detectors. One light detector is mounted to travel beneath the upper one of the sheets, the second light detector is spaced laterally on the opposite side of the edge from the first light detector and travels clear of the upper sheet while the third light detector is spaced between the first two and is positioned to travel along the edge of the upper sheet. The three light detectors are connected to a feedback control system which adjusts the turning angle of the steering wheel to maintain the edge of the top sheet in the middle of the central detector.

Figure 1:
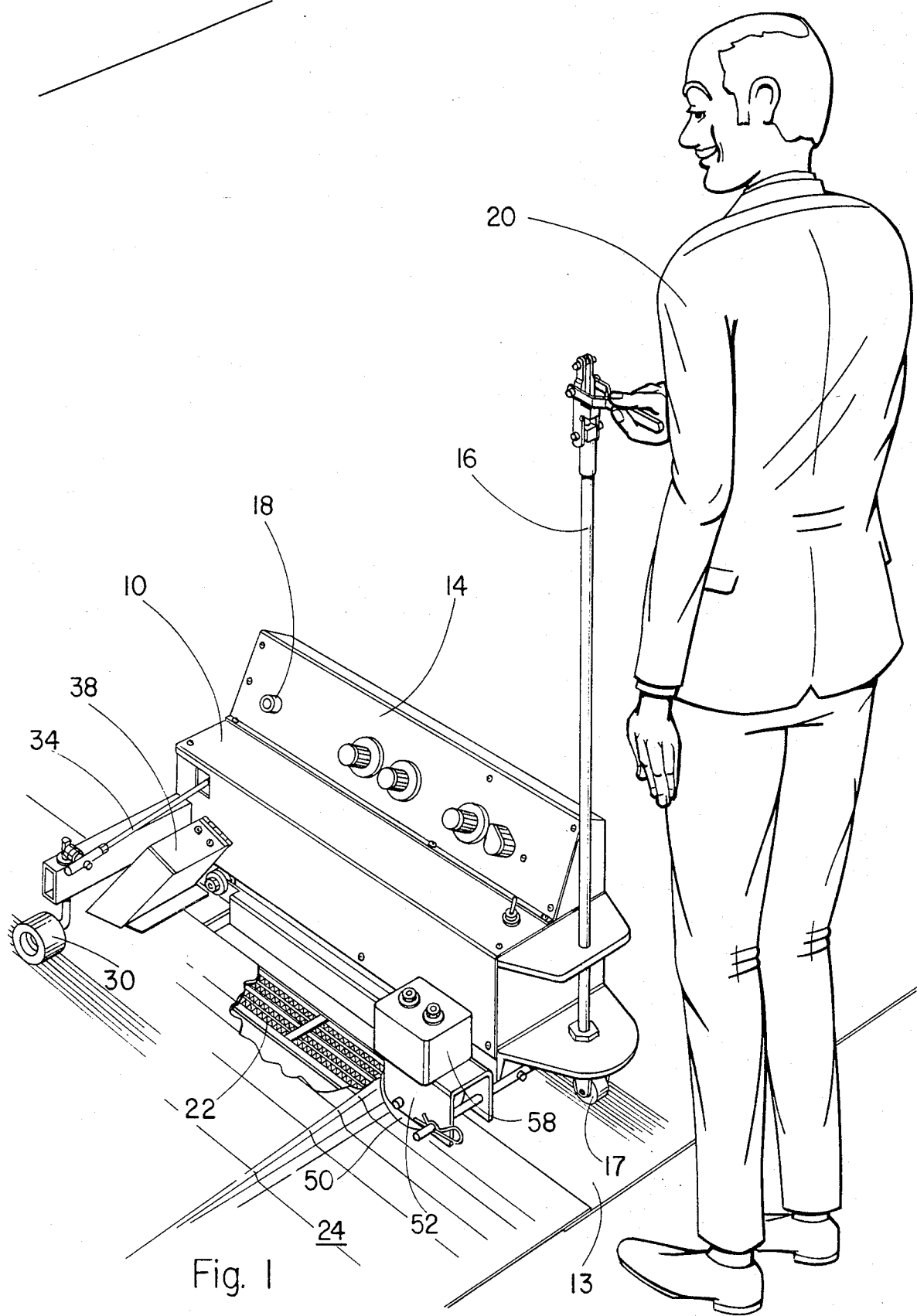
FIG. 1 is a view in perspective of a welding machine embodying the present invention and operably positioned for welding the seams to join two sheets of thermoplastic resin with a portion of the edge of the upper sheet removed to reveal the underlying radiant heaters.
Figure 2:
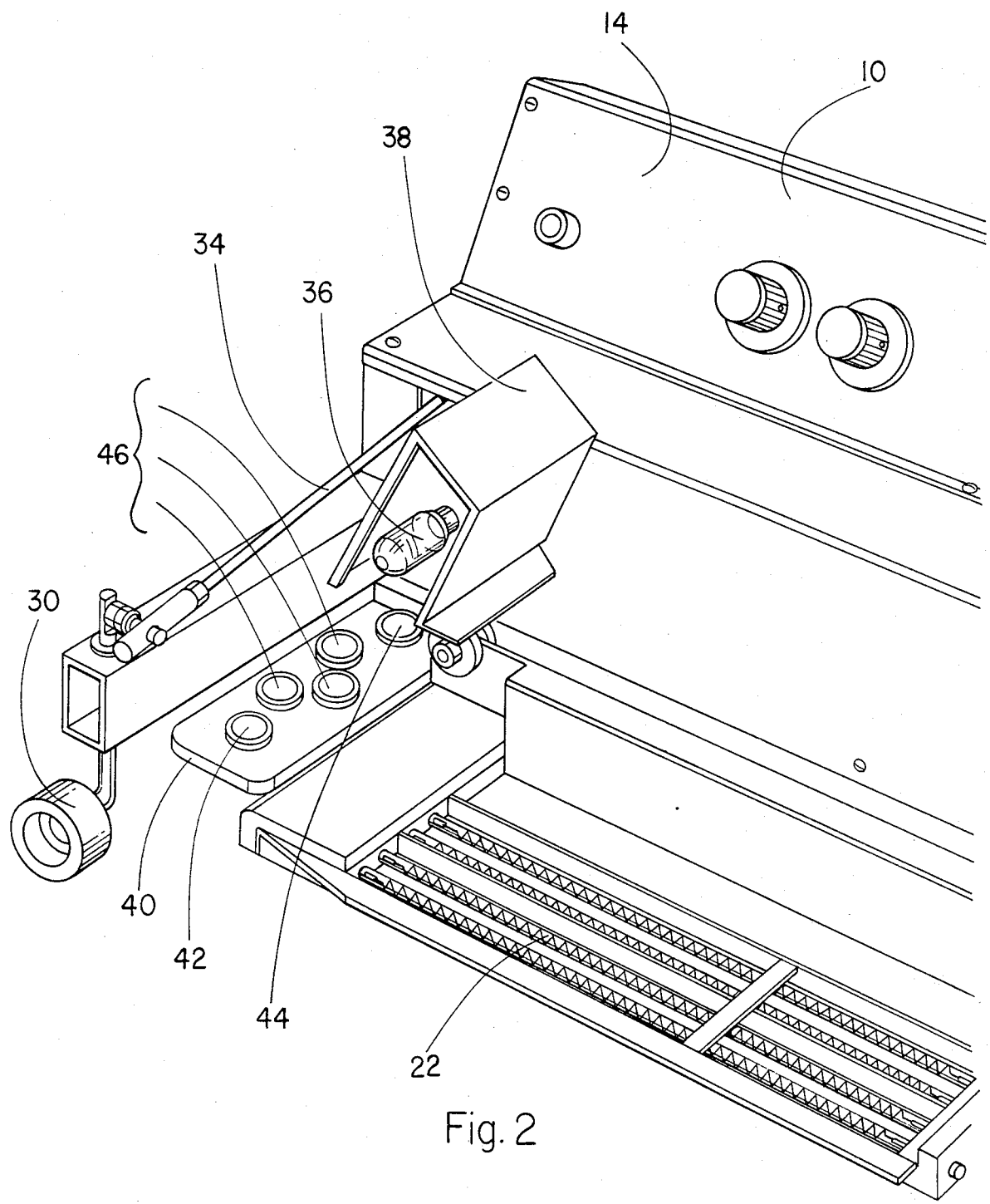
FIG. 2 is a view in perspective of a portion of the embodiment of FIG. 1 illustrating in detail the radiant heater and the edge position detecting structure for the automatic steering system of the present invention.
Figure 3:
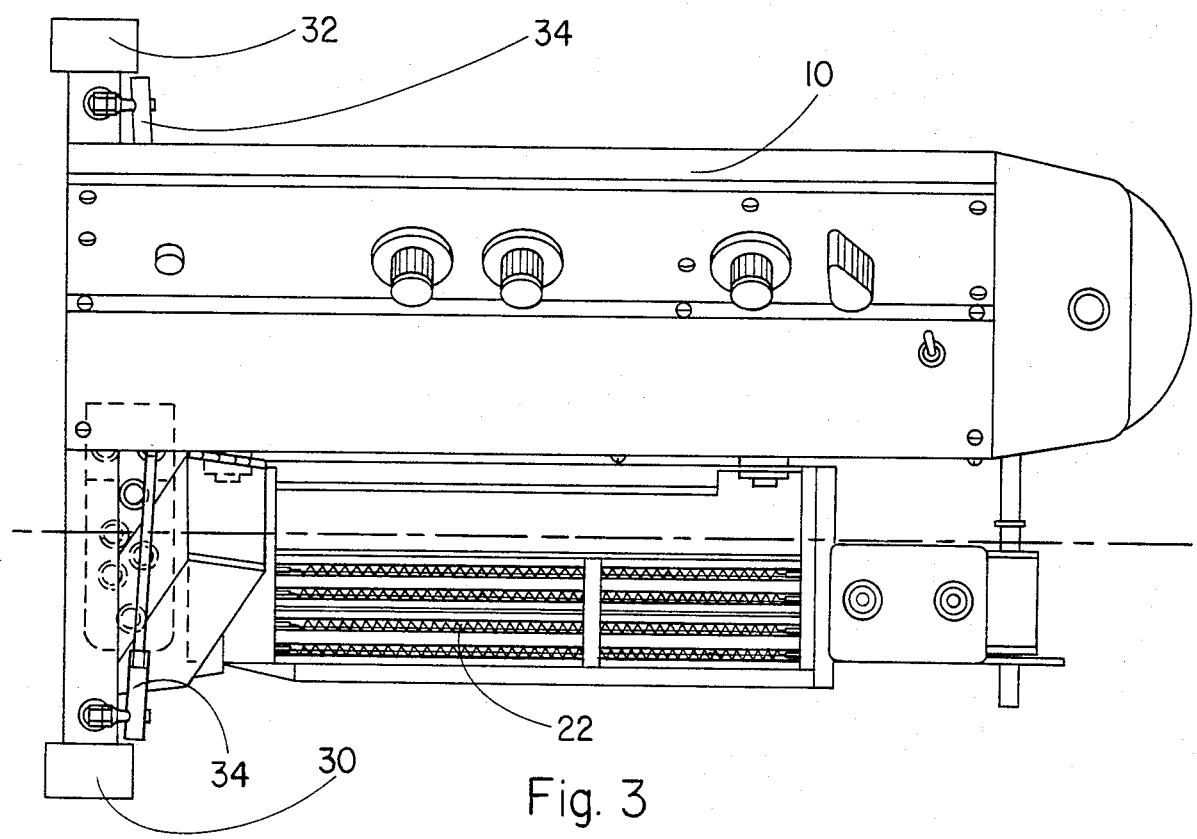
FIG. 3 is a top plan view of the embodiment of FIG. 1.
Figure 4:
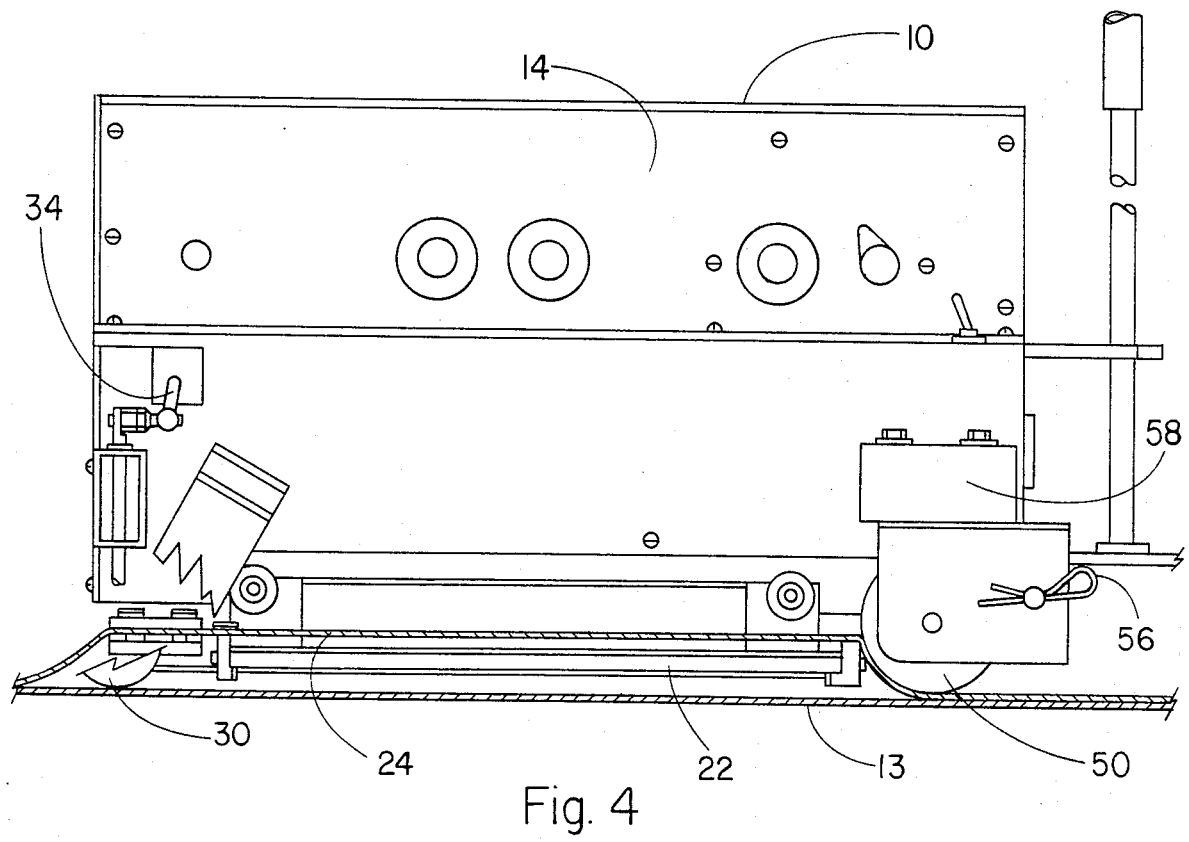
FIG. 4 is a view in side elevation of the embodiment of FIG. 1.
Figure 5:
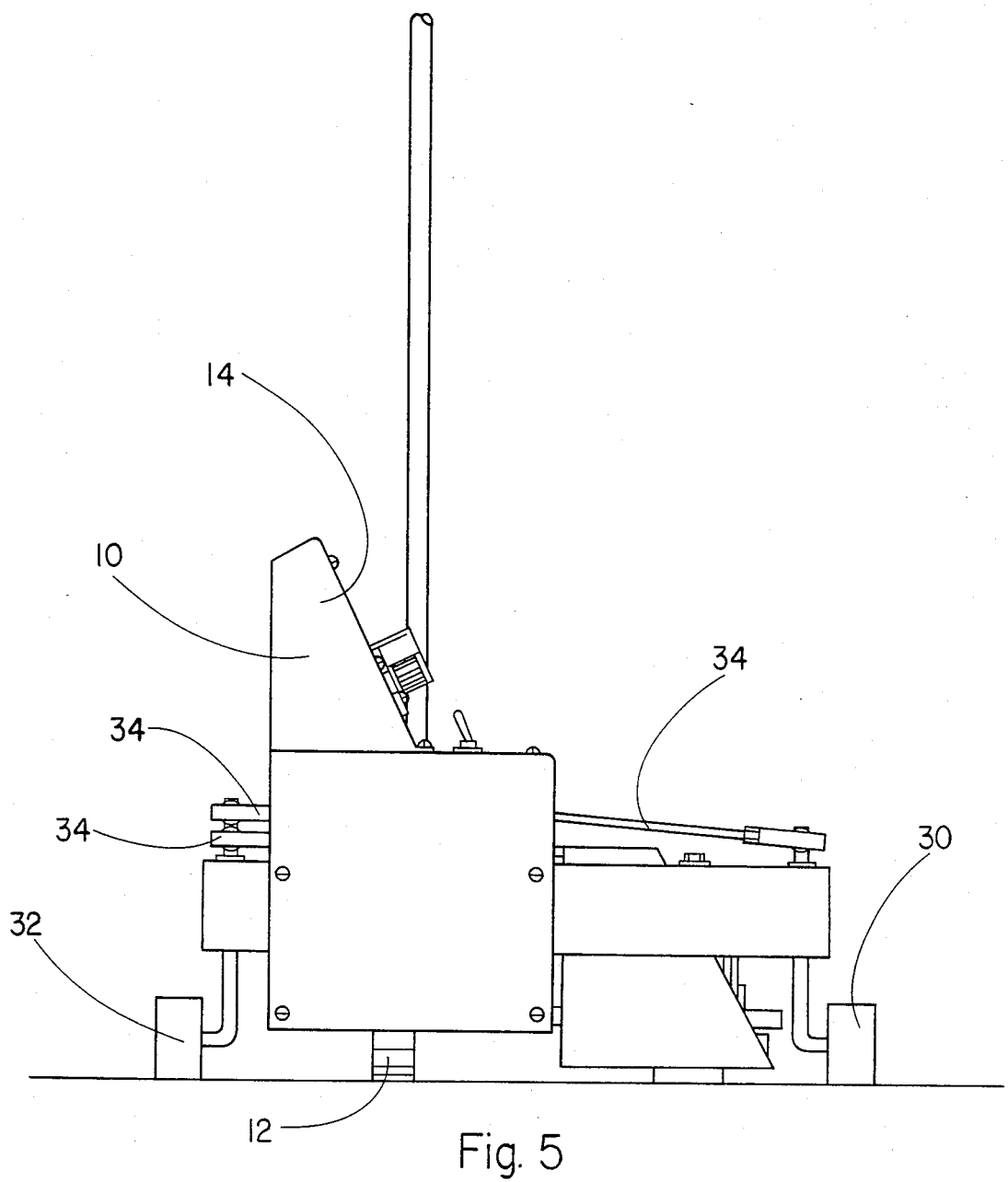
FIG. 5 is a view in front elevation of the embodiment of FIG. 1.

In describing the preferred embodiments of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

Referring to FIGS. 1–4, the preferred embodiment of a seam welding machine embodying the present invention has a housing 10 which protectively contains the electrical control and power circuitry, the drive motor and the drive train which is drivingly linked to a drive wheel 12 protruding from the bottom of the housing 10. The drive wheel engages the lower of the two sheets 13 of thermoplastic resin which are to be welded together by the machine. The machine controls are readily accessible upon upper control panel 14 of the housing 10.

A vertical control bar 16 extends upwardly from the housing 10 to support a handle which lowers the casterwheel 17. A start/stop switch 18 is mounted on the control panel 14 for convenient operation by an operator 20.

An electrically energized radiant heater panel 22 extends laterally from the side of the housing 10. It is spaced slightly above the edge portion of the lower sheet 13. During operation the edge of the upper sheet 24 travels above the radiant heater 22 so that the interfacing surfaces of the sheets 13 and 24 are heated as the welding machine travels along the seam and are then joined. As shown more clearly in FIG. 2, the radiant heater panel 22 consists of a plurality of laterally spaced nichrome coils mounted in transparent longitudinally extending glass tubes.

The welding machine is steered by a pair of free turning steering wheels 30 and 32 which are connected by conventional steering linkages 34 to a steering motor controlled by a feedback control circuit. This circuit is described below. In order to detect the position of the edge of the upper sheet 24 and a light 36 which can be any suitable source of light radiation is mounted near the forward end of the machine and above the feed path which extends through the machine. The light 36 is mounted in a protective shield 38, a portion of which is removed in FIG. 2 to reveal the light 36.

Below the light 36 and immediately below the feed path of the upper sheet 24 is a support bar 40 upon which are mounted a plurality of light detectors such as photoresistors. A first light detector 42 is mounted for travelling beneath the upper sheet 24 during operation. A second light detector 44 is mounted inboard of the first light detector 42, spaced laterally from the edge of the upper sheet 24 to travel above the lower sheet 13 and beside the upper sheet 24. A third light detector consisting of three photoresistors 46 is mounted between the first and second light detectors and is positioned to travel along beneath the edge of the upper sheet. Nominally, the edge of the upper sheet passes over the center of the central one of the three light detectors 46. These three light detectors are connected to a feedback control circuit which in turn is connected to the steering wheels 30 and 32. The control circuit adjusts the turning angle of the steering wheels in order to maintain the edge of the top sheet substantially in the middle of the third light detector 46.

A compressing wheel 50 is mounted aft of the feed path of the edge of the upper sheet 24 for compressing together the opposed overlapping, heated edges of the thermoplastic resin sheets as they pass from the heater beneath the compressing wheel. The compressing wheel 50 is rotatably mounted to a support bracket 52 which in turn is pivotally mounted to a laterally extending axle 54. The bracket 52 is secured on the rod by a removable pin 56 and a substantial downward force is exerted by a weight 58 which is bolted to the bracket 52. In this manner the bracket 52 may be tilted forwardly and downwardly to position the compressing wheel 50 in its operable position. In the alternative, the bracket 52 may be lifted upwardly and backwardly against a stop to raise the compressing wheel above the plastic sheets in a nonoperable transportation position.

In operation the machine travels over the lower thermoplastic resin sheet 13 with the radiant heater 22 passing immediately above the edge portion of the lower sheet. The upper thermoplastic sheet 24 follows a feed path extending up over the light detectors mounted on the support bar 40, immediately above the radiant heater 22 and then downwardly beneath the compressing wheel 50. The upper surface of the edge region of the lower sheet and the lower surface of the edge region of the upper sheet and heated to a temperature at which they become quite plastic and tacky. These opposed, overlapping edges are then joined as they pass from the heater 22 and are compressed together by the compressing wheel or roller 50.

For typical steady state operation on a material such as vinyl-coated fabric, the heater 22 must heat the thermoplastic materials to a temperature within the range of 400° F. to 600° F. Typical travel speed of the machine along the overlapping edges is approximately eight feet per minute.

The difficulties described above arise, however, during the warm up and cool down portions of an operating cycle. In order to overcome the problems of transient operation, a motor speed control is used which accelerates the propelling motor to full speed and decelerates the propelling motor to a stop in response to actuation of the start/stop switch 18 in accordance with a selected algorithm rather than instantaneously. In particular, we have found it most advantageous to maintain the machine in a stationary position for a brief time interval following initial energization of the heater 22. Thereafter, the welding machine is accelerated exponentially until steady state operating speed is obtained. A subsequent actuation of the start/stop switch 18 initiates an exponential deceleration of the machine. The concept of the invention is to tailor the linear velocity of the welding machine to the heat radiation rate of the heater. Thus, whenever the temperature of the heat source of the welding machine is increased or decreased, the heat source is propelled along the opposed edges of the overlapping sheets at a velocity which is changed so that it is substantially proportional to the instantaneous temperature of the heat source. An exponential rate of change is both a good approximation to the change in heater temperature and is conveniently obtained in simple electronic circuitry.

Figure 6:
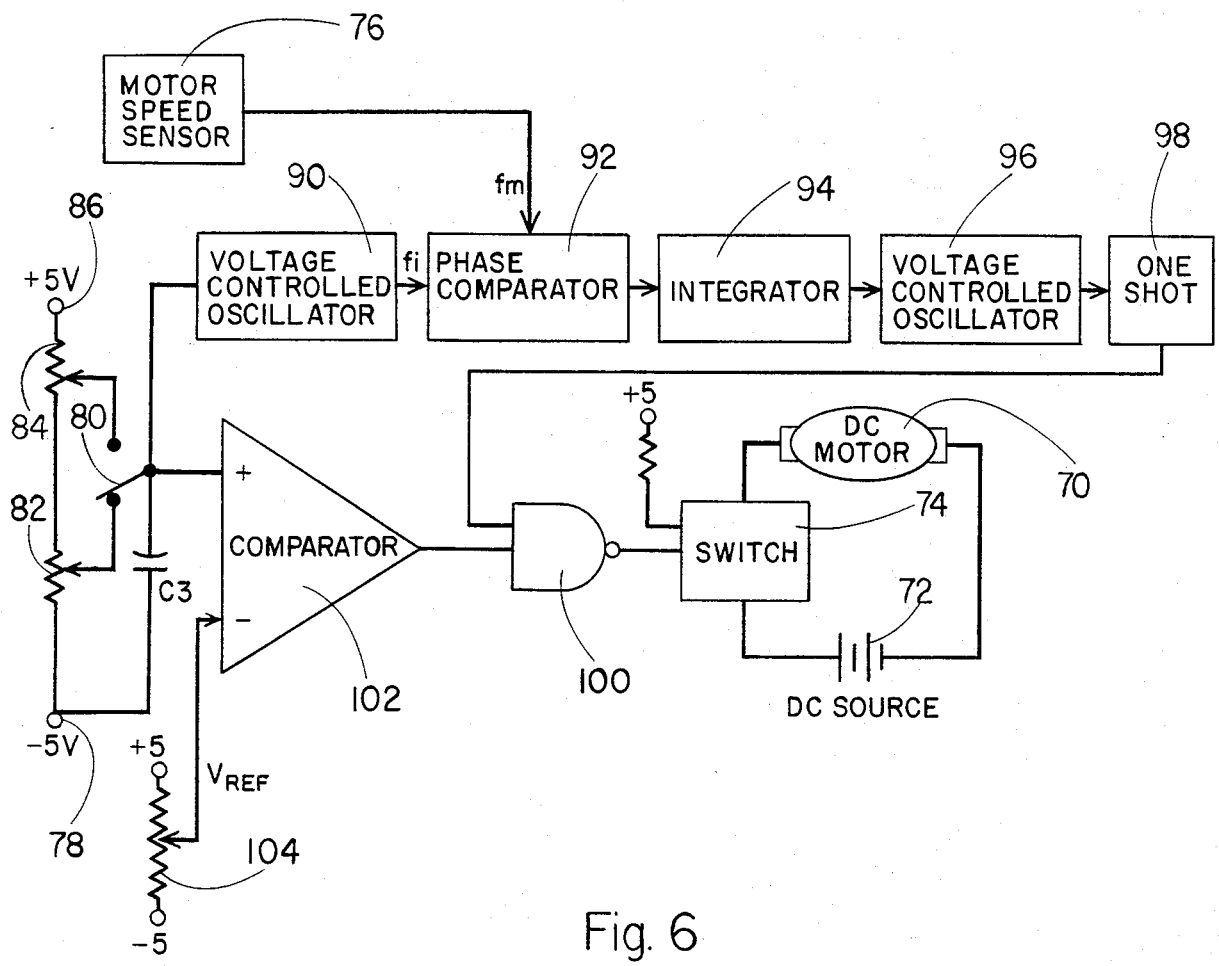
FIG. 6 is a schematic block diagram of the control circuit for controlling the start up and stopping linear velocity of the welding machine.

FIG. 6 illustrates the control circuitry for accomplishing this desired change in linear velocity of machine propulsion. Referring to FIG. 6, the prime mover which is drivingly linked to the drive wheel 12 is a DC motor 70 supplied with electrical energy from a DC source 72 through an electronic switch 74. The preferred DC source is simply a conventional full wave rectifier power supply. The start/stop switch 18 includes a single pole, double throw switch for alternately accelerating and decelerating the machine as desired.

A timing capacitance $C_3$ is connected between a $-5$ volt voltage source 78 and the wiper 80 of the start/stop switch 18. The wiper 80 is alternately connectable to the wiper of a potentiometer 82 or the wiper of the potentiometer 84, which in turn is connected to a positive voltage supply 86. Thus, the start/stop switch 18, together with the capacitance $C_3$ and the potentiometers 82 and 84 provide a resistance-capacitance network which is connected to the start/stop switch to alternately charge and discharge the capacitor exponentially in response to actuation of the switch 18. When the switch 18 is moved upwardly to connection with potentiometer 84 the capacitance is exponentially charged to a $+10$ volts. Upon actuation of the switch 18 into connection with the potentiometer 82 the capacitance is exponentially discharged.

The capacitance voltage is applied to a first voltage controlled oscillator 90 which provides an output frequency which varies in correspondence with the voltage on the capacitor $C_3$. This provides an output frequency $f_1$ which is, for example, proportional to the voltage on the capacitance $C_3$. That output signal from the voltage controlled oscillator 90 is applied to one of the two inputs to a phase comparator 92. Connected to the other input of the phase comparator 92 is the output from a motor speed sensor 76.

The motor speed sensor is connected to the drive train of the welding machine and provides a time changing output signal at a frequency which is proportional to machine linear velocity. For example, a conventional shaft encoder system, including alternately transparent and opaque radial segments formed on a disk and a light source and light detector positioned on opposite sides of the disk, will provide pulses at a frequency which is proportional to machine velocity.

The output of the phase comparator 92 provides a DC voltage having an amplitude which is proportional to the phase difference between the periodic signal from the motor speed sensor 76 and the output signal from the voltage controlled oscillator 90. That output from the phase comparator 92 is applied to an integrator circuit 94 for integrating the phase difference with respect to time. Its output is applied to a second controlled oscillator 96 which provides an output signal at a frequency which is proportional to its input voltage. The output from the voltage controlled oscillator 96 is applied to a one shot 98. The one shot output provides pulses which are triggered by an edge of the output signal from the voltage controlled oscillator 96. All pulses have the same pulse width regardless of the frequency at which the voltage controlled oscillator is operating. These pulses are applied through a logic gate 100 and the electronic switch 74 to the DC motor 70.

This circuit effectively causes the speed of the DC motor to track the voltage of the capacitance $C_3$ to accomplish the exponential acceleration and deceleration of the welding machine. The speed is tracked by applying a train of energy pulses to the DC motor 70. The pulses all have the same duration, but their frequency is changed to vary the average current applied to the DC motor 70 and thereby to change its speed. Upon acceleration, for example, as the voltage on capacitance $C_3$ increases the frequency from voltage controlled oscillator 90 increases. Any phase difference, and therefore any frequency difference, between the frequency of the signal from the motor speed sensor 76 and the frequency from the voltage controlled oscillator 90 produces an output voltage from the phase comparator which is integrated and causes a change in the frequency of the voltage controlled oscillator until the phase comparator detects the identical frequency at the identical phase at both inputs. Thereupon the voltage controlled oscillator frequency is not further changed. Increases in the frequency of the voltage controlled oscillator 96 increase the frequency of the energy pulses applied to the DC motor, thus increasing the speed of the motor and therefore increasing the speed of the machine. Machine speed is increased until the frequencies applied to the phase comparator 92 are identical. The reverse occurs upon deceleration when the capacitance $C_3$ is discharged.

Figure 7:
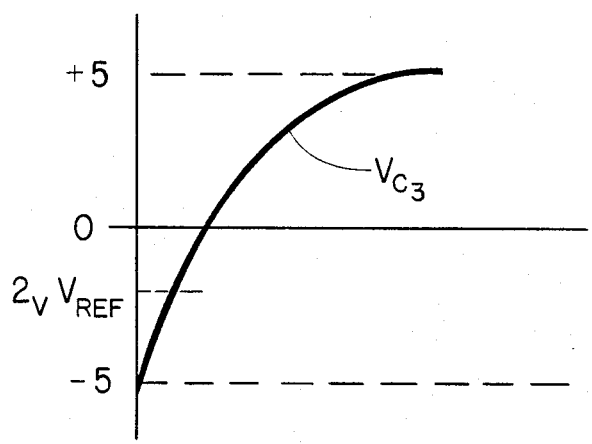
FIG. 7 is a graphical illustration of the preferred acceleration and deceleration control rate.

FIG. 7 illustrates the exponential charging of the capacitance $C_3$ from its initial voltage of $-5$ volts at the wiper 80 of the start/stop switch 18 to its fully charged level of $+5$ volts.

Figure 9:
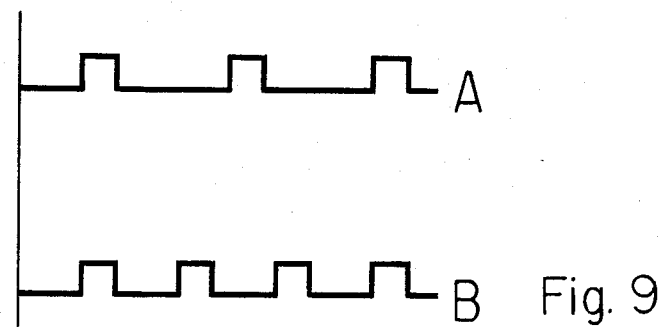
FIG. 9 is an oscillogram of two representative power pulse trains for driving the propelling motor of the preferred embodiment of the invention.
Figure 9:
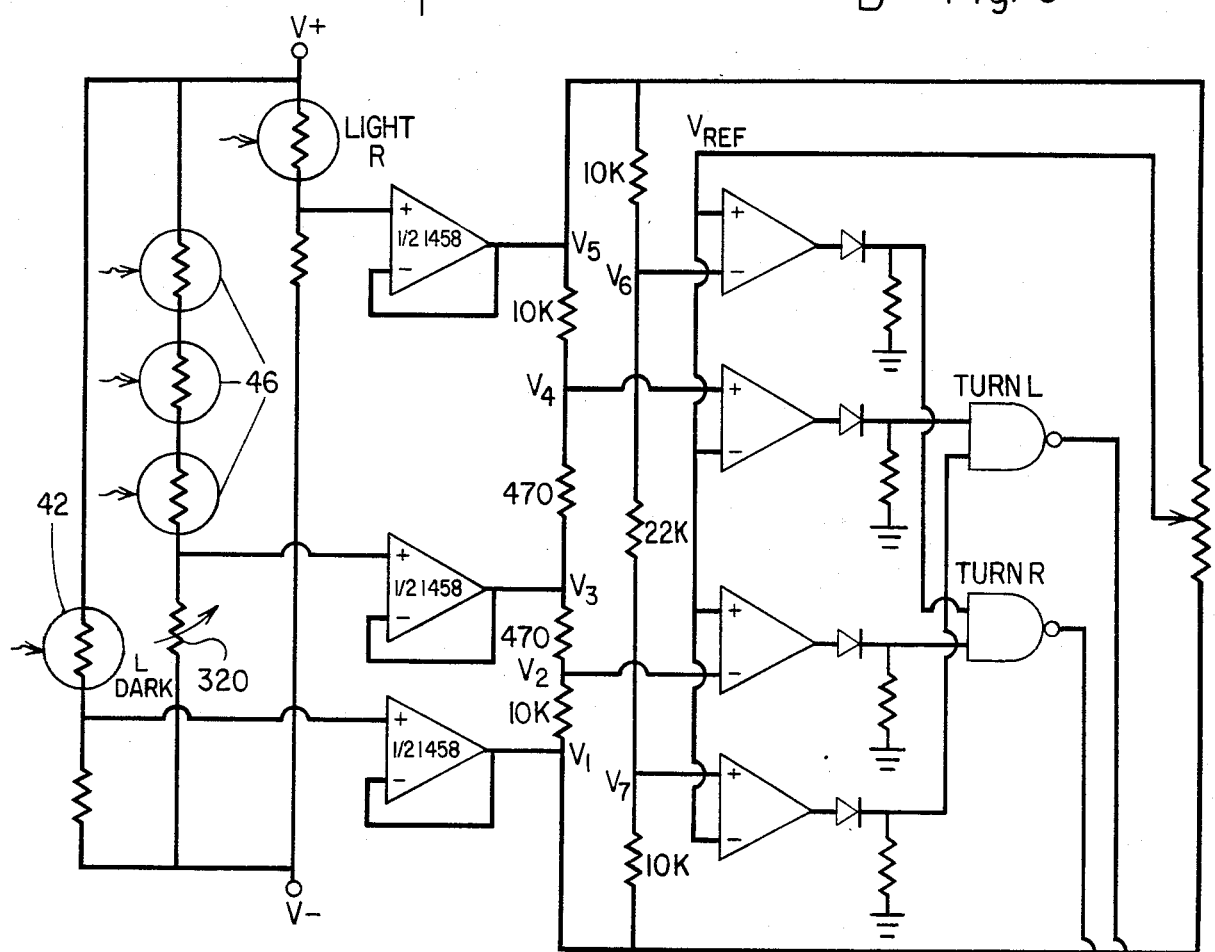

FIG. 9 illustrates the energy pulses which are applied to the DC motor 70. For example, pulse train A represents a lower frequency train of pulses which are applied to the DC motor 70 at a relatively slower speed. Pulse train B illustrates a higher frequency and thus higher duty cycle pulse train which causes the DC motor to operate at a relatively higher speed.

It is desirable to have the machine rest not only when the radiant heaters are entirely cool, but also when they are only slightly warmed. Thus, the machine should be at rest during the first portion of the warm up cycle before a significant temperature is reached and also at the last portion of a cooling down cycle after the radiant heaters have sufficiently cooled. To accomplish this, a comparator 102 has its output connected to a logic gate 100, which in the preferred embodiment is a nand gate. The noninverting input of the comparator 102 is connected to the wiper 80 of the start/stop switch 18. The inverting input is connected to the wiper of a potentiometer 104 which is connected between the positive and negative voltage sources for the circuitry. In this manner the potentiometer 104 may be adjusted to a selected reference voltage between the $-5$ and $+5$ power supply voltage levels.

FIG. 7 illustrates a reference voltage of 2 volts. In that circuit so long as the voltage on capacitance $C_3$ is more negative than the reference voltage, the comparator output switches the logic gate 100 to prevent the pulses from the one shot 98 from being applied to the electronic switch 74. When the capacitance voltage $C_3$ is more positive than the reference voltage at the wiper of potentiometer 104, logic gate 100 is switched to allow application of the pulse train to the electronic switch 74.

Figure 8:
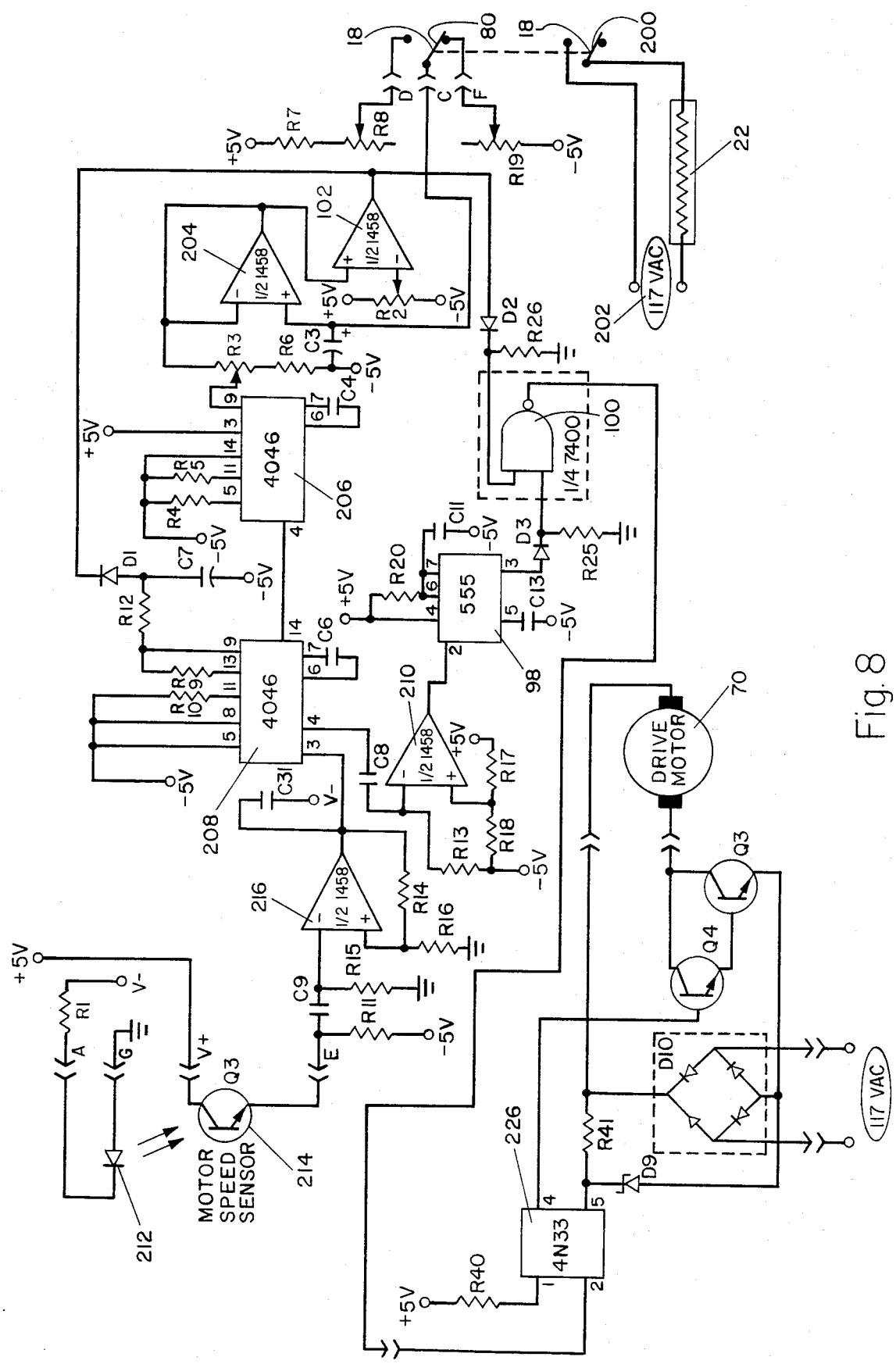
FIG. 8 is a detailed schematic diagram of the circuitry illustrated in FIG. 6.

FIG. 8 illustrates the motor speed controlling circuitry in more detail. The start/stop switch 18 includes a second single pole, single throw switch 200 which is connected to supply power from the electrical utility power source 202 to the radiant heater 22.

The start/stop switch 18 initiates charging or discharging of the capacitance $C_3$. The voltage of the capacitance $C_3$ is applied through an impedance matching amplifier 204 to the comparator 102 and also through a gain controlling potentiometer R3 to the input at pin 9 of a voltage controlled oscillator included within the integrated circuit 206. The integrated circuit 206 is a conventional phase locked loop circuit having the terminals of its component parts accessible.

The output of the voltage controlled oscillator in the integrated circuit 206 is applied from pin 4 to the input of the phase detector in the integrated circuit 208 which is identical to the integrated circuit 206. The output of the phase detector in the IC 208 is applied from pin 13 to an integrator circuit including R9, R12 and C7. This is applied at pin 9 to the input of the voltage controlled oscillator on IC 208. The output of that voltage controlled oscillator is applied from pin 4 through an amplifier 210 to the one shot 98. The motor speed sensor has a light source 212 and light detector 214, the signal from which is applied through amplifier 216 to the other input of the phase detector in the IC 208.

The output of the one shot 98 is applied through logic gate 100 to an electronic switch which includes an optocoupler 226 connected to control a pair of transistors Q3 and Q4.

Figure 10:
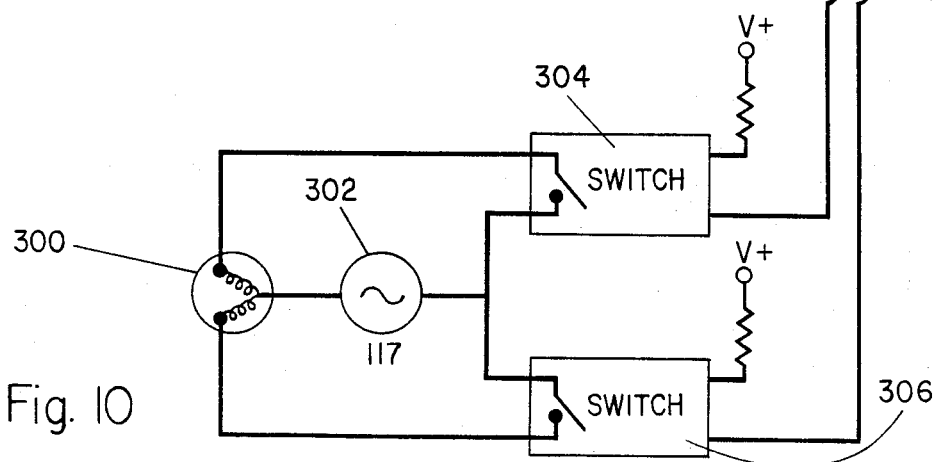
FIG. 10 is a schematic diagram of the steering control circuitry of the present invention.

The steering system of the present invention is illustrated in FIG. 10. A dual direction motor 300 is connected to the utility voltage source 302 through either a right turning switch 304 or a left turning switch 306. These switches 304 and 306 cause turning of the steering wheels in their respective direction in response to control of the remaining circuitry. The light detectors 42 through 46 are connected as illustrated. The central detector 46 preferably consists of three separate detectors in order to widen their effective range of operation and reduce the rate at which the current through them changes in response to variations in a lateral position of the edge of the upper sheet 24.

The three light detectors 42, 44 and 46 form a dynamically balanced circuit. The detectors 42 and 44 provide upper and lower reference voltages. The central light detector 46 causes the voltage applied to vary between those upper and lower limits in correspondence with the position of the edge of the upper sheet with respect to the machine. The potentiometer 320 in series with the light detectors 46 forms a voltage divider. When that voltage divider is within a selected voltage differential from a voltage which is half way between the voltage applied from the light detectors 42 and 44 neither the switch 304 nor switch 306 is actuated. However, if the voltage from the light detectors 46 shifts beyond those limits in either direction, then the appropriate one of the turning switches 304 or 306 is actuated to turn the machine and bring the edge of the upper sheet back to the center of the light detector 46. The details of this circuit are not described further because they are not claimed. Instead, a complete schematic is given along with the following parts list for the preferred embodiment of the invention:

| | |
|---|---|
| C1-220 uF 16 V Electrolytic | C2-220 uF 16 V Electrolytic |
| C1A-1.5 uF Tantalum | C2A-1.5 uF Tantalum |
| C3-220 uF 16 V Electrolytic | C4-.01 uF Metal film |
| C5-Disc | C6-.01 uF Metal film |
| C7-33 uF 10 V Tantalum | C8-.01 uF Metal film |
| | C8A-.047 uF Metal film |
| C9-.047 uF Metal film | C10-Disc |
| C11-.01 uF Metal film | C12-Disc |
| C13-Disc | C14-.047 uF Metal film |
| C15-Disc | C16-Disc |
| C17-Disc | C18-.047 uF Metal film |
| C19-.01 uF Metal film | C20-Disc |
| C21-Disc | C22-Disc |
| C23-1.5 uF Tantalum | C24-1.5 uF Tantalum |
| C25-3300 uF 35 V Electrolytic | C26-1000 uF 35 V Electrolytic |
| C27-.047 uF Metalized | C28-.047 uF Metal Film |
| C29-.2 uF 200 V | C30-.2 uF 200 V |
| D1-1N4148 | D2-1N4148 |
| D3-1N4148 | D4-1N4148 |
| D5-1N4148 | D6-1N4148 |
| D7-1N4148 | D8-1N4148 |
| D9-5.1 V Zener 500 mW | D10-4 A 400 V Bridge |
| D11-1.5 A 100 V Bridge | D12-1N4148 |
| D13-1N4148 | D14-SE 5455-3 Infrared LED Honeywell |
| Q1-7805 | Q2-7905 |
| Q3-2N6510 | Q4-92PU10 |
| Q5-T2800C RCA | Q6-T2800C RCA |
| Q7-SC160E GE | Q8-L14F1 Phototransistor GE |
| R1-47 Ohms | R2-10K Ohms Trimmer |
| R3-100K Ohms Potentiometer | R4-1K Ohms |
| R5-500K Ohms Trimmer | R6-27K Ohms |
| R7-150K Ohms | R8-100K Ohms Potentiometer |
| R9-100K Ohms | R10-100K Ohms |
| R11-10K Ohms | R12-10K Ohms |

-continued

| | |
|---|---|
| R13-10K Ohms | R14-100K Ohms |
| R15-100K Ohms | R16-1K Ohms |
| R17-10K Ohms | R18-1K Ohms |
| R19-200K Ohms Trimmer | R20-100K Ohms |
| R21-2.2K Ohms | R22-10K Ohms |
| R23-100K Potentiometer | R23A-100K Ohms |
| R24-1K Ohms | R25-1K Ohms |
| R26-1K Ohms | R27-1K Ohms |
| R28-1K Ohms | R29-1K Ohms |
| R30-1K Ohms | R31-5K Ohms Potentiometer |
| R32-22K Ohms | R33-10K Ohms |
| R34-470 Ohms | R35-10K Ohms |
| R36-470 Ohms | R37-10K Ohms |
| R38-10K Ohms | R39-2.2K Ohms |
| R40-180 Ohms ½ Watt | |
| R41-22K Ohms 1 Watt | R42-150 Ohms ½ Watt |
| R43-180 Ohms ½ Watt | R44-10K Ohms |
| R45-1K Ohms | R46-1K Ohms |
| R47-10K Ohms | R48-10K Ohms |
| R49-10K Ohms | R50-10K Ohms |
| R51-10 Ohms 2 Watts | R52-10 Ohms 2 Watts |
| R53-1.2K Ohms ½ Watt | R54-150 Ohms ½ Watt |
| R55-180 Ohms ½ Watt | R56-180 Ohms ½ Watt |
| R57-1.2K Ohms ½ Watt | R58-150 Ohms ½ Watt |
| R59-1K Ohms | R60-2.2K Ohms |

While preferred embodiments of the present invention have been illustrated and described in detail, it will be understood that various modifications in details of construction and design may be made without departing from the spirit of the invention or the scope of the following claims.

We claim:

1. An improved portable seam welding machine for joining sheets of thermoplastic resins, said machine being of the type having wheels, a drive motor connected through a drive train to at least one of said wheels, heating means and feed means for feeding the opposed, overlapping edges of said sheets through the machine, wherein the improvement comprises the combination of:
   (a) a start/stop switch means for alternately starting and stopping the machine;
   (b) heating means connected to said start/stop switch for alternately being actuated and deactuated; and
   (c) motor speed control means connected to said switch means and said motor for alternately gradually accelerating said motor to full speed and gradually decelerating said motor to a stop in response to actuation of said start/stop switch and in accordance with a selected algorithm.

2. A welding machine in accordance with claim 1 wherein said heating means comprises a radiant heater interposed between the feed paths of said sheet edges.

3. A welding machine in accordance with claim 1 wherein said control means changes the linear velocity of said machine exponentially.

4. A welding machine in accordance with claim 1 wherein said motor is of the type wherein motor speed is proportional to average motor current and said control means more particularly comprises:
   (a) a resistance-capacitance network connected to said switch to alternately charge and discharge said capacitor exponentially in response to actuation of said switch;
   (b) a first voltage controlled oscillator connected to said network to provide an output frequency which varies in correspondence with the voltage of said capacitor;
   (c) a motor speed sensor connected to the drive train of said welding machine for providing a time changing output signal at a frequency which is proportional to machine linear velocity;
   (d) a phase comparator having its inputs connected to the output of said motor speed sensor and said first voltage controlled oscillator;
   (e) an integrator circuit connected to the output of said phase comparator for integrating the phase difference with respect to time;
   (f) a second voltage controlled oscillator connected to the output of said integrator circuit;
   (g) a one shot circuit means connected to the output of said second oscillator for providing output pulses in proportion to the output frequency of said second voltage controlled oscillator, each of said pulses having a selected duration; and
   (h) a second switch means having a control input connected to the output of said one shot circuit means and connected to a source of DC power and to said motor for providing pulses of DC power to said motor in correspondence with the output of said one shot circuit means.

5. A welding machine in accordance with claim 4 wherein said heating means comprises a radiant heater interposed between the feed paths of said edges.

6. A welding machine in accordance with claim 4 wherein a logic gate is interposed in the circuit to have one of its inputs connected to the output of said one shot circuit means and its output connected to the input of said second switch means and wherein a comparator has its output connected to the other input of said logic gate, an input connected to said R-C network and its other input connected to a reference voltage whereby said logic gate disables the switching of said second switch by the one shot whenever the network input signal to the comparator is less than the reference voltage.

7. A welding machine in accordance with claim 6 wherein said heating means comprises a radiant heater interposed between the feed paths of said edges.

8. An improved welding machine in accordance with claim 1 and further comprising automatic steering means connected to a movable steering wheel of said machine for detecting the position of one of said edges relative to said machine and for steering said machine to maintain said edge position within a selected range.

9. An improved welding machine in accordance with claim 8 wherein said automatic steering means includes edge position detecting circuitry comprising: (a) a light source mounted above said sheets; (b) a first light detector mounted to travel beneath the upper one of said sheets; (c) a second light detector spaced laterally from the edge of said upper sheet to travel above the lower one of said sheets and beside the upper sheet; (d) a third light detector between said first and second light detectors and positioned to travel along the edge of the upper sheet; and (e) a feedback control circuit connected to said three light detectors and to said steering wheel to adjust the turning angle of the steering wheel to maintain the edge of the top sheet substantially in the middle of the third detector.

10. An improved method for driving a motor driven heat source along the opposed edges of relatively stationery, overlapped multiple sheets of thermoplastic resin for bonding them together, wherein the improvement comprises:

accelerating the heat source along the edges during its heater warm up in proportion to the time rate of change of the heater temperature until it is brought up to a nominal operating velocity at the nominal operating temperature of the heater.

11. An improved method in accordance with claim 10 wherein the heat source, upon termination of the supply of energy to its heat source is decelerated in proportion to the time rate of change of the heater temperature.

12. An improved method in accordance with claim 10 or 11 wherein the velocity of the motor driven heat source is changed exponentically.

* * * * *